(12) United States Patent
Ganiere

(10) Patent No.: US 6,802,391 B2
(45) Date of Patent: Oct. 12, 2004

(54) AIRCRAFT NON-AMBULATORY/AMBULATORY BOARDING AND OFF-LOADING SYSTEM

(76) Inventor: Jeff Ganiere, 330 N. Spring Blvd., Tarpon Springs, FL (US) 34689

( * ) Notice: Subject to any disclaimer, the term of this patent is extended or adjusted under 35 U.S.C. 154(b) by 122 days.

(21) Appl. No.: 10/153,413

(22) Filed: May 22, 2002

(65) Prior Publication Data
US 2003/0217891 A1 Nov. 27, 2003

(51) Int. Cl.$^7$ ................................................ B60P 1/00
(52) U.S. Cl. ........................ 182/69.6; 182/141; 182/1; 414/495
(58) Field of Search ............................. 182/69.6, 63.1, 182/69.1, 2.5, 141, 148, 1, 15, 16, 17, 116, 115, 727; 414/495

(56) References Cited

U.S. PATENT DOCUMENTS

| | | | | |
|---|---|---|---|---|
| 2,606,078 A | * | 8/1952 | Brock | 182/2.5 |
| 2,777,737 A | * | 1/1957 | Balogh | 182/1 |
| 3,666,127 A | * | 5/1972 | Guyaux | 414/495 |
| 4,304,518 A | * | 12/1981 | Carder et al. | 414/495 |
| 5,154,569 A | * | 10/1992 | Eryou et al. | 414/495 |
| 5,555,953 A | * | 9/1996 | Henderson | 182/141 |
| 2001/0047905 A1 | * | 12/2001 | Boyer | 182/15 |

* cited by examiner

*Primary Examiner*—Alvin Chin-Shue
(74) *Attorney, Agent, or Firm*—Dennis G. LaPointe; Mason Law, P.L.

(57) ABSTRACT

The invention is a loading system, which is a combination adjustable height stairway and a landing platform at one end that can be elevated to the level of the aircraft loading door and a lifting portion for loading articles to and from the landing platform. Both the lifting portion and the adjustable height stairway are side by side and are adapted to move in unison to and from the aircraft and further adapted to independently elevate or descend. The stairway and lifting portion may each be independently operated by at least one hydraulically driven motor. The system can moved to and from the aircraft using a combination of independent drive wheels and swivel wheels in order to provide tight maneuverability of the combined stairway and lifting portion.

13 Claims, 5 Drawing Sheets

AIRCRAFT NON-AMBULATORY/AMBULATORY BOARDING AND OFF-LOADING SYSTEM

The invention generally relates to a loading system which is a combination adjustable height stairway and a landing platform at one end that can be elevated to the level of the aircraft loading door and a lift means for loading articles to and from the landing platform. Both the lift means and the adjustable height stairway are side-by-side and are adapted to move in unison to and from the aircraft, and further adapted to independently elevate or descend. The stairway and lift means may each be independently operated by at least one hydraulically driven motor. The system can be moved to and from the aircraft using a combination of independent drive wheels and swivel wheels in order to provide tight maneuverability of the combined stairway and lift means.

Figure 1:
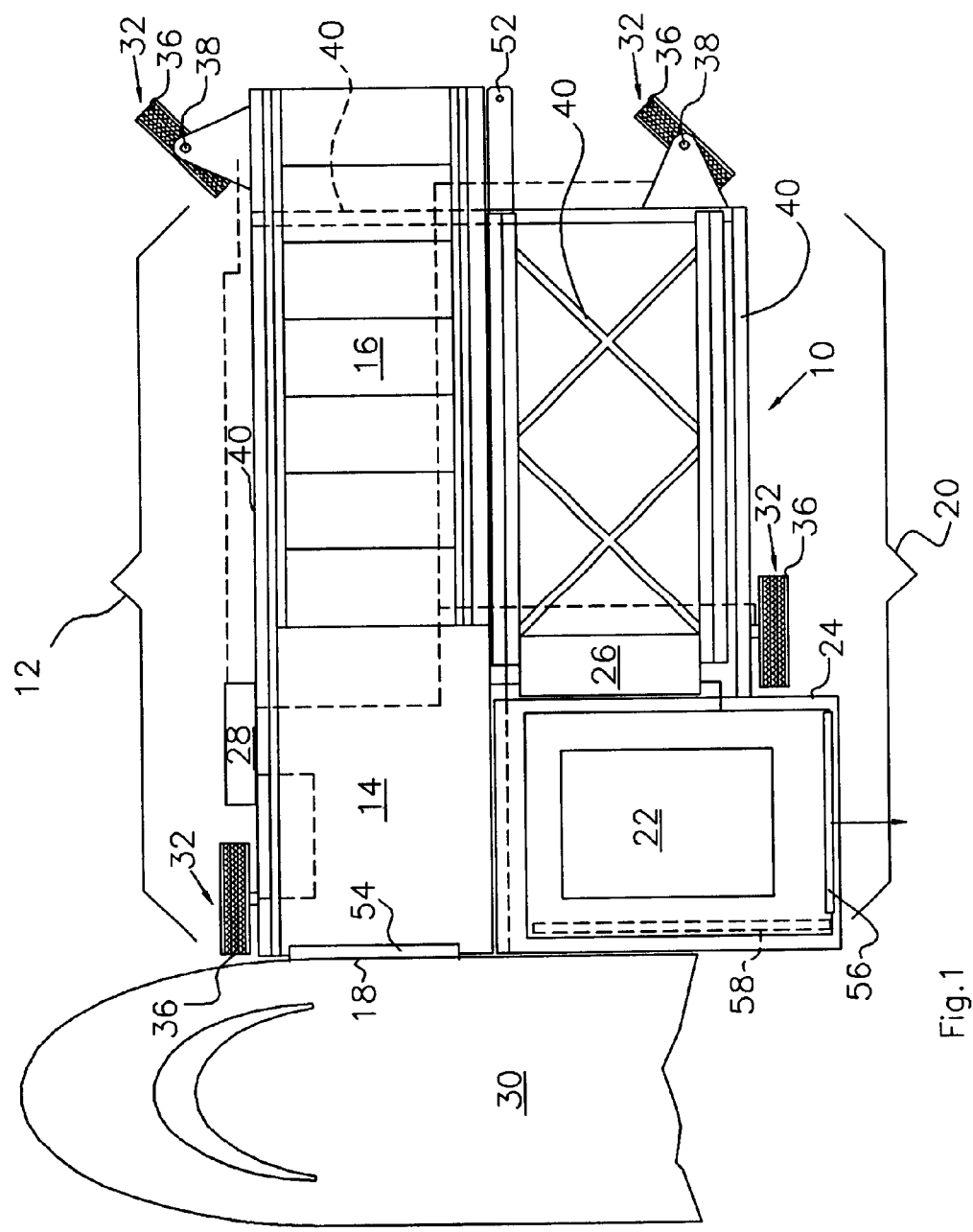
FIG. 1 is a conceptual plan view depiction of a typical application of the invention.
Figure 2:
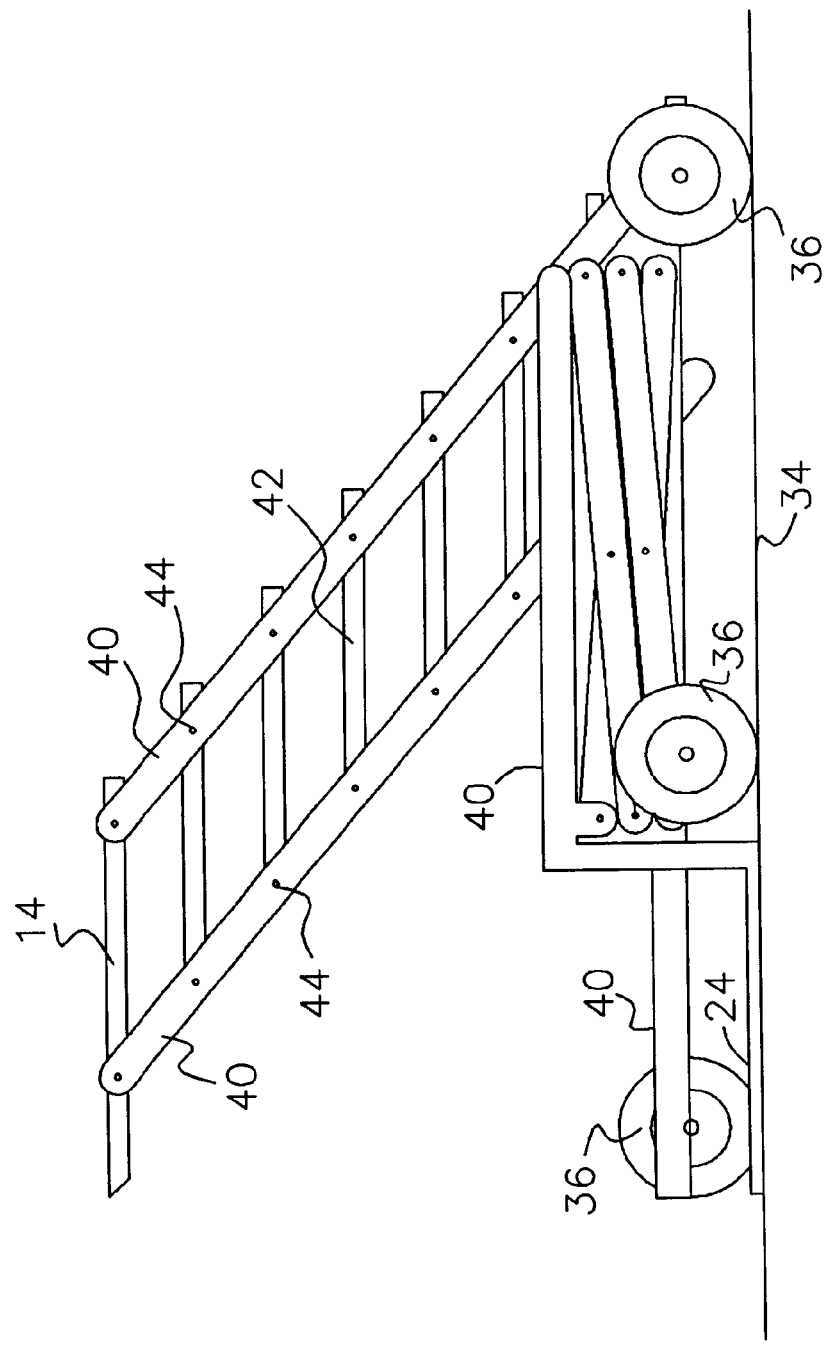
FIG. 2 is an elevation view of the invention separate from the aircraft with the stairway portion elevated and the lifting portion lowered to the ground surface.

Referring now to the drawings, FIG. 1 discloses one embodiment of the present invention, which is an aircraft loading system and is depicted generally as 10. The system 10 includes an adjustable height stairway portion 12, which has a landing 14 at one end of a stairway 16. The landing 14 can be elevated to an aircraft service door 18 for servicing of the aircraft 30.

In combination with the stairway portion 12, the system further includes a lifting portion 20. This lifting portion 20 serves as means for lifting and lowering articles 22 to and from the landing 14. The lifting portion 20 also includes a platform 24 that can be elevated so as to be in close juxtaposition with the landing 14 so that the articles 22 can be transferred to or from the platform 24 from or to the landing 14.

The stairway portion 12 and the lifting portion 20 are typically in a generally parallel side-by-side relationship and connected with each other so as to move in unison. The system frame structure is typically interconnected to allow for independent operation of the elevating characteristics of each portion but is generally moved as one loading apparatus along the ground surface 34 or tarmac either for temporary stand-by storage or for movement to an aircraft 30 in need of service. Structural fabricators skilled in the art of fabricating equipment handling devices should know how to interconnect the frame structure 40 of system 10 so as to allow unified movement and maintain rigidity to the structure.

In the drawings, safety railings or hand rails along the stairway 16 and around the landing 14 are not shown for clarity of the inventive combination of components associated with the system 10. However, it is understood that railings meeting OSHA standards would be provided and adapted along the stairway 16 so as to provide for its intended safety feature at any angular orientation of the stairway 16. Similarly, the landing 14 would also have the necessary safety railings including any temporary railing or chain on the side adjacent to where the platform 24 is located.

The system 10 further includes means 26 for independently elevating and lowering the stairway portion 12 and the lifting portion 20, that is, the stairway portion 12 may be raised or lowered to a desired height regardless of the position of the platform 24 of the lifting portion 20 and similarly, the platform 24 may be raised or lowered to a desired position regardless of the position of the landing 14. It is preferable that dual controls be incorporated such that the stairway portion 12 and the lifting portion 20 can be independently raised or lowered from the ground level or from the landing 14 or platform 24 when standing on said landing 14 or platform 24.

In addition to the above features, the invention 10 further includes steering and mobility means 28 for steering and moving the system 10 in position for servicing an aircraft. The steering and mobility means 28 includes bearing means 32 attached to predetermined locations on the system 10 as shown in FIGS. 1–5. The bearing means 32 provide for ground bearing and for maintaining stability of the system 10 during relative movement of the system 10 with the ground surface 34 and during operation when servicing the aircraft 30.

In the embodiment depicted in the drawings, the bearing means 32 has four spaced-apart wheel assemblies 36. Clearly, additional wheel assemblies 36 may be included, but three can be incorporated and still maintain control and stability of the system 10.

In order to enhance tight maneuverability of the system 10, it is recommended that the steering and mobility means 28 have swivel connections 38 between at least one of the spaced-apart wheel assemblies 36 of the bearing means 32 and the frame structure 40 of the system 10 to which the steering and mobility means 28 is supported.

For driving the aircraft loading system, at least one of the spaced-apart wheel assemblies 36 should be an independently driven wheel assembly; however, it is recommended that at least two of the spaced-apart wheel assemblies 36 be each independently driven. The steering and mobility means 28 should include the driving mechanism which are in communication (as conceptually shown by the dotted lines in the drawings between the wheels and reference 28) with the independently driven wheels 36, for driving said wheels. The driven wheels may include wheels with swivel capabilities.

Ideally, the steering and mobility means 28 would be centralized in one convenient area and mounted from the system framework and would typically include components to power and operate the system. The system could be electrically powered (DC or AC), hydraulically powered or gas engine powered. For quick movement of the system 10 over relatively long distances, it is recommended that a clutch system be incorporated with the drive mechanism and that tow hitch means 52 be provided to the frame structure so that system 10 can be towed to the desired tarmac or hangar location.

Each step 42 of the stairway 16 is adapted so as to pivot (see 44 in the drawings) in such a way so as to maintain a horizontal orientation with the elevating and lowering of the stairway portion. The drawings depict a conceptual application where each step 42 is supported by two side rails or frame members 40 on each side of the steps. The frame members 40 interconnect the steps and as the actuator means 46 elevated or lowers the stairway 16, the steps pivot while maintaining the flat orientation of each step so personnel can walk up or down the stairway.

The portions 12,20 may be operated using hydraulically controlled actuators 46 or other elevator technology known in the art. The means for independently elevating and lowering the stairway portion 26 is contemplated to include a central control location with components attached to a convenient location on the frame structure 40 of the system 10, would include the driven actuator means 46. Similarly, the means for independently elevating and lowering the lifting portion 26 also includes driven actuator means 46, represented in FIG. 3 conceptually only. There are many different ways that one skilled in the art could mount an actuator or other lifting mechanism to the lifting portion 20.

The drawings merely depict an example of one embodiment or application of lifting portion 20, where a scissor lifting portion 48 is incorporated into the invention. The scissor lifting portion 48 has an upper portion 50 from which the platform 24 is suspended and adapted to be lowered to the ground surface 34 and elevated to be juxtapositioned with the landing 14. The upper portion 50 is typically part of the frame structure 40 comprising the support structure for the invention 10.

As mentioned above, it should be understood that the stairway portion 12 would have hand rails and a safety rail at the landing 14, however, the drawings do not include any such depiction for clarity purposes only. The platform 24 would typically be used to elevate or lower large objects such as wheelchairs, scooters, boxes and other articles 22 from/to the aircraft service door 18. When the platform 24 is not elevated next to the landing 14, a safety rail or chain would typically be installed along the side of the landing 14 next to the lifting portion 20.

Another feature is a pivotable ramp 54 at the end of landing 14. Most stairways currently use a bumper pad which is brought against or near the aircraft threshold of the loading service door 18. This ramp 54 can be lowered into and through the service door 18 access opening to rest on the aircraft floor. This feature therefore enhances the safety aspect of the system 10 as it eliminates any gap between landing 14 and the service door threshold.

Figure 3:
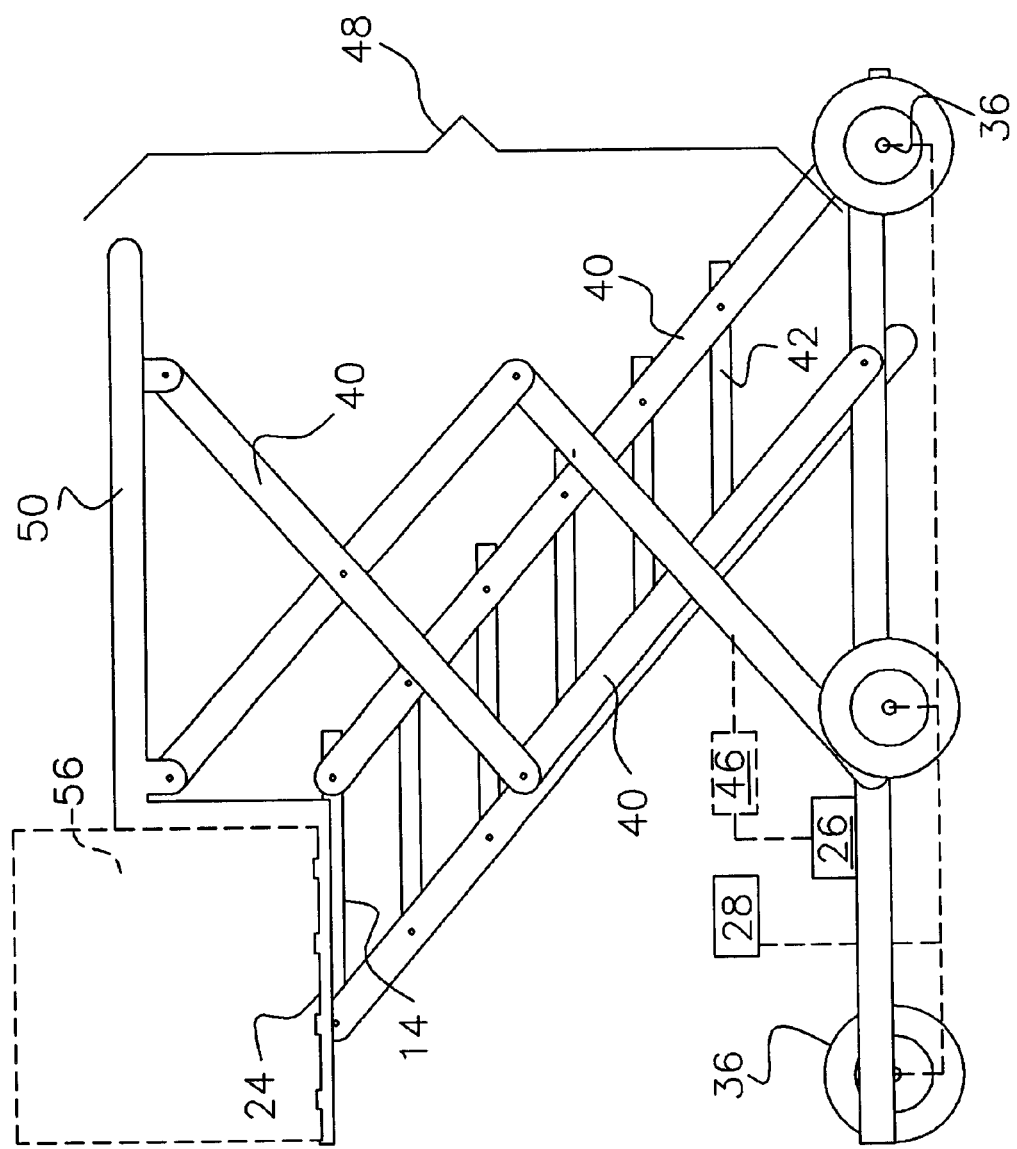
FIG. 3 is an elevation view of invention separate from the aircraft with both the stairway portion and the lifting portion fully elevated and the lifting platform essentially at the approximate same height as the stairway landing.
Figure 4:
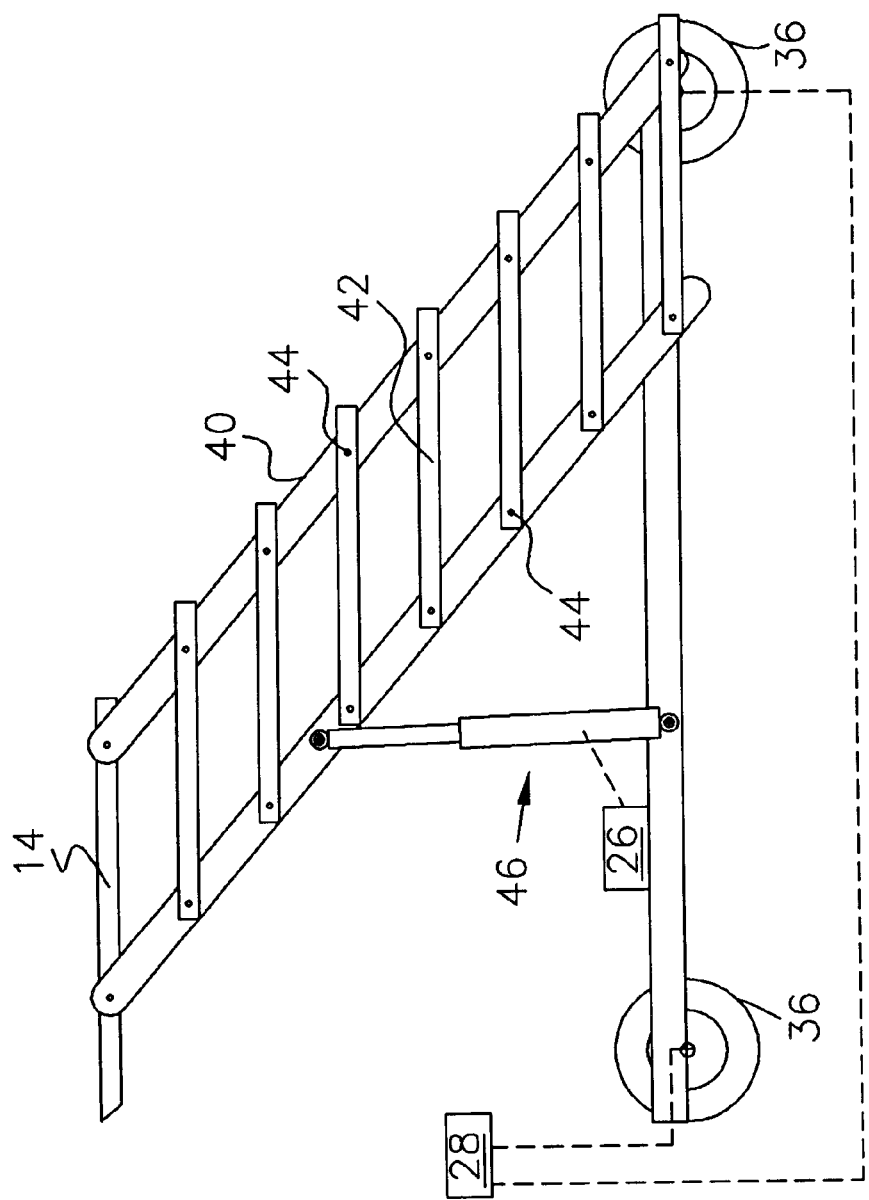
FIG. 4 is an elevation view of a cross-section of the stairway portion at an elevated position.
Figure 5:
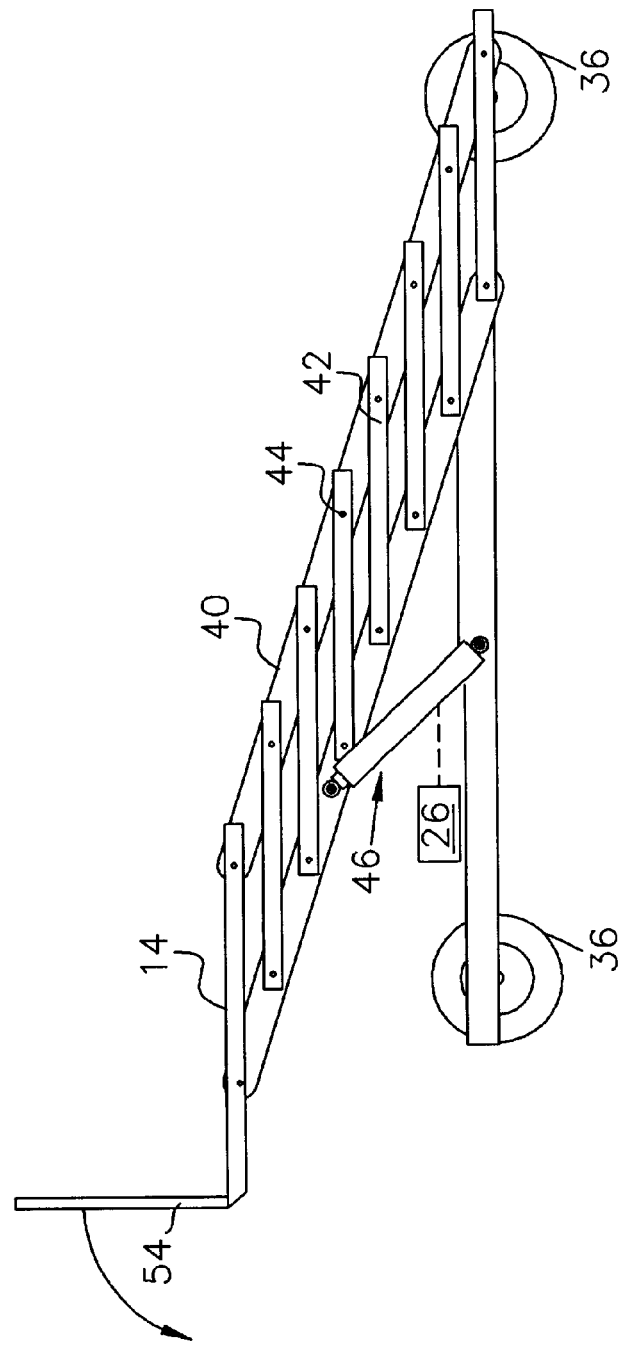
FIG. 5 is an elevation view of a cross-section of the stairway portion at a lowered position.

A pivotable loading ramp 56 is also included on platform 24 edge. This ramp 56 not only facilitates loading onto and unloading from the platform 24, but also acts as a safety rail when the platform is elevated or lowered. FIGS. 1 and 3 depict this ramp 56 in the upright position. It is further preferred for obvious safety reasons that when ramp 56 is raised in the upright position, ramp 56 engage with a latch (not shown), which incorporates a switch which closes a circuit which then allows for the operation of the platform 24. Disengaging the ramp 56 from the latch would then effective make the switch act like a dead-man's switch and the operation would stop.

Platform 24 may also include a removable railing 58, which would be located near the edge that runs parallel to the aircraft. In situations where the system 10 is desired to moved such that platform 24 is aligned with the service door 18, the safety rail could be removed to facilitate loading and unloading.

The combined landing 14 and platform 24 width is contemplated to be about 7 feet wide for most applications and the invention overall length with the stairway from the leading edge of the landing 14 is contemplated to be about 10–11 feet long. The platform in this typical application may be about 4 feet wide by 3 feet long.

If swivel wheel connections are used, it is recommended that they be capable of a fill 360° rotation.

The lifting portion 20 can be designed to lift almost any desired load; however, a load capacity of approximately 800 pounds should be satisfactory for most applications.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,
What is claimed is:

1. An aircraft loading system comprising:
    an adjustable height stairway portion including a landing at one end of a stairway which can be elevated to an aircraft service door, said stairway portion; being means for boarding and off-loading ambulatory passengers from the aircraft;
    each step of the stairway having means for maintaining a horizontal orientation with the elevating and lowering of the stairway portion to allow the continuing boarding or off-loading of ambulatory passengers at any operational elevated height of the stairway portion;
    a lifting portion, the lifting portion being means for lifting and lowering articles and non-ambulatory passengers to and from the landing;
    the lifting portion including a platform that can be elevated so as to be in close juxtaposition with the landing so that the articles can be transferred to or from the platform from or to the landing;
    the stairway portion and the lifting portion being in a generally parallel side-by-side relationship and connected with each other so as to move along the ground surface in unison, and for allowing, when positioned along the aircraft body with the landing juxtapositioned to the aircraft service door, the simultaneous off-loading or boarding of ambulatory passengers and articles or non-ambulatory passengers;
    means for independently elevating and lowering the stairway portion and the lifting portion; and
    steering and mobility means for steering and moving the system in position for servicing an aircraft.

2. The aircraft loading system according to claim 1, wherein the steering and mobility means further comprises:
    bearing means attached to predetermined locations on the system, said bearing means for ground bearing and for maintaining stability of the system during relative movement of the system with the ground surface and during operation when servicing the aircraft.

3. The aircraft loading system according to claim 2, wherein the bearing means is at least three spaced-apart wheel assemblies.

4. The aircraft loading system according to claim 3, wherein the steering and mobility means further includes swivel connections between at least one of the spaced-apart wheel assemblies of the bearing means and a frame structure of the system to which the steering and mobility means is supported.

5. The aircraft loading system according to claim 3, wherein at least one of the spaced-apart wheel assemblies is an independently driven wheel assembly.

6. The aircraft loading system according to claim 3, wherein at least two of the spaced-apart wheel assemblies are each independently driven wheel assemblies.

7. The aircraft loading system according to claim 1, wherein the means for independently elevating and lowering the stairway portion includes driven actuator means.

8. The aircraft loading system according to claim 1, wherein the means for independently elevating and lowering the lifting portion includes driven actuator means.

9. The aircraft loading system according to claim 1, wherein the lifting portion further comprises:

a scissor lifting portion having an upper portion from which the platform is suspended and adapted to be lowered to the ground surface and elevated to be juxtapositioned with the landing.

10. The aircraft loading system according to claim 9, wherein the scissor lifting portion includes driven actuator means.

11. The aircraft loading system according to claim 1, further comprising:

a pivotable landing ramp attached to the landing, said landing ramp being adapted to serve as a safety rail when in an upright position while the stairway portion is being elevated or lowered and to serve as a walkway ramp from the landing through the aircraft service door when it is lowered through said aircraft service door.

12. The aircraft loading system according to claim 1, further comprising:

a removable safety rail portion attached to the platform on a side that would abut the aircraft, wherein when the platform is aligned with the aircraft door, the safety rail portion is removable to allow for unloading and loading through the aircraft service door.

13. The aircraft loading system according to claim 1, further comprising:

a pivotable platform ramp attached to the platform, said platform ramp being adapted to serve as a safety rail when in an upright position while the stairway portion is being elevated or lowered and to facilitate movement of articles on and off the platform.

\* \* \* \* \*

UNITED STATES PATENT AND TRADEMARK OFFICE
CERTIFICATE OF CORRECTION

PATENT NO. : 6,802,391 B2
DATED : October 12, 2004
INVENTOR(S) : Jeff Ganiere

It is certified that error appears in the above-identified patent and that said Letters Patent is hereby corrected as shown below:

Column 4,
Line 16, replace "an adjustable height stairway portion" with -- a pivotal adjustable height stairway including --.
Line 17, replace "end of a stairway" with -- end of the stairway --.
Line 18, replace "said stairway portion;" with -- said stairway being --.
Line 21, replace "means for maintaining" with -- means for pivotally maintaining --.
Line 23, replace "the stairway portion to allow" with -- the stairway to allow --.
Line 25, replace "the stairway portion;" with -- the stairway --.
Line 26, replace "a lifting portion," with -- an elevatable lifting portion, --.
Lines 29 and 30, replace "that can be elevated so as to be" with -- wherein the platform in an elevated position is --.
Line 33, replace "the stairway portion and" with -- the stairway and --.
Line 34, replace "side-by-side relationship" with -- side-by-side juxtaposition relationship --.
Line 42, replace "way portion and the lifting portion;" with -- way and the lifting portion; --.

Column 5,
Line 20, replace "the stairway portion" with -- the stairway --.

Column 6,
Line 15, replace "the stairway portion" with -- the stairway --.

Signed and Sealed this

Fourth Day of January, 2005

JON W. DUDAS
*Director of the United States Patent and Trademark Office*